(12) United States Patent
Bryan (10) Patent No.: US 9,582,469 B1
(45) Date of Patent: *Feb. 28, 2017

(54) SYSTEM AND METHODS FOR DETERMINING ATTRIBUTES FOR ARITHMETIC OPERATIONS WITH FIXED-POINT NUMBERS

(71) Applicant: The MathWorks, Inc., Natick, MA (US)

(72) Inventor: Thomas A. Bryan, Westborough, MA (US)

(73) Assignee: The MathWorks, Inc., Natick, MA (US)

( * ) Notice: Subject to any disclaimer, the term of this patent is extended or adjusted under 35 U.S.C. 154(b) by 283 days.

This patent is subject to a terminal disclaimer.

(21) Appl. No.: 13/936,881

(22) Filed: Jul. 8, 2013

Related U.S. Application Data

(63) Continuation of application No. 11/316,007, filed on Dec. 22, 2005, now Pat. No. 8,484,262.

(51) Int. Cl.
*G06F 17/10* (2006.01)

(52) U.S. Cl.
CPC .................................. *G06F 17/10* (2013.01)

(58) Field of Classification Search
None
See application file for complete search history.

(56) References Cited

U.S. PATENT DOCUMENTS

| | | | |
|---|---|---|---|
| 3,683,163 A | 8/1972 | Hanslip | |
| 3,751,650 A | 8/1973 | Koehn | |
| 4,379,338 A | 4/1983 | Nishitani et al. | |
| 4,791,590 A | 12/1988 | Ku et al. | |
| 5,235,537 A | 8/1993 | McWhirter et al. | |
| 5,272,659 A | 12/1993 | Starr | |
| 7,085,794 B2 | 8/2006 | Azadet et al. | |
| 2001/0025292 A1 | 9/2001 | Denk et al. | |
| 2004/0122882 A1 | 6/2004 | Zakharov et al. | |

OTHER PUBLICATIONS

Dictionary.labortalk.com, "Fixed-point arithmetic," retrieved from the internet at http://encyclopedia.laborlawtalk.com/ Fixed-point_arithmetic, 2 pages.

(Continued)

*Primary Examiner* — Michael D Yaary
(74) *Attorney, Agent, or Firm* — Nelson Mullins Riley & Scarborough LLP (57) ABSTRACT

The present application is directed to determining attributes for results of arithmetic operations with fixed-point numbers. An indication is received of possible word lengths to store digits representing a result of an arithmetic operation with fixed-point numbers. An indication is received of how a placement of a radix point will be determined in the digits representing the result of the arithmetic operation with fixed-point numbers. When calculating the fixed-point arithmetic operation, one of the possible word lengths is employed for storing the digits representing the result of the fixed-point arithmetic operation. A placement of a radix point in the digits is based on the received indication of how the radix point is to be determined. Growth rate for a number of digits in a result of a series of arithmetic calculations is less than N, where N is equal to the number of arithmetic operations performed.

19 Claims, 6 Drawing Sheets

(56) References Cited

OTHER PUBLICATIONS

Downright Software Collective, "Python Fixed Point Math Object," retrieved from the internet at http://fixedpoint.sourceforge.net/, 9 pages (2002).
Gribble, B., "Proposal for modifying gnucash to use exact quantities," retrieved forom the internet at http://www.gnucash.org/pipermail/gnucash-devel/2000-July/000273.html, 7 pages (2002).
Hook, B., "An introduction to fixed point math," retrieved from the internet at http://www.bookofhook.com/Article/GameDevelopment/AnIntroductiontoFixedPoin.html, 12 pages (2004).
Kemp, M., "3.5.9 Fixed Point Types," retrieved from the internet at http://www.grammatech.com/rm95html-1.0/rm9x-03-05-09.html, 3 pages (1995).
Kum, K-I. et al., "A floating-point to fixed-point C converter for fixed-point digital signal processors," Proc. 2nd SUIF Compiler Workshop, 8 pages (1997).
Lebedev, Alexei, "Fixed Point Math for Speed Freaks," Machtech, vol. 10(3), 8 pages (1994).
McClellan, J.H. et al., "Wordlength Effects," Computer-Based Exercises for Signal Processing Using MATLAB, 5 Prentice Hall, Chapter 7, pp. 205-245 (1998).
Oppenheim, Alan V. et al., "Overview of finite-precision numerical effects," Discrete-Time Signal Processing, Prentice Hall, Chapter 6.7, pp. 328-335 (1989).
The GnuCash Project, "Welcome to GNU Cash," retrieved from the internet at http://www.gnucash.org/, 9 pages (2005).
The Mathworks, Fixed-Point Blockset for Use with Simulink, User's Guide, Version 4, Mathworks, Inc., 538 pages, (2002).
The Mathworks, Fixed-Point Toolbox for Use with MATLAB, User's Guide, Version 1, Mathworks, Inc., 302 pages (2004).
The Mathworks, Simulink Fixed Point for Use with Simulink, User's Guide, Version 5, Mathworks, Inc., 312 pages (2004).
Visual Solutions, Inc., "VisSim/Fixed Point 4.5:Fixed-Point Algorithm Software," Visual Solutions, Inc., 1 page.
Wikipedia.com, "Fixed-point arithmetic," retrieved from the internet at http://en.wikipedia.org/wiki/Fixed_point_arithmetic, 2 pages (2005).
Wikipedia.com, "Tremor (software)," retrieved from the internet at http://en.wikipedia.org/wiki/Tremor_(software), 1 page (2005).
Wilkinson, J.H., "The Fundamental Arithmetic Operations," Rounding Errors in Algebraic Processes, Dover Publications, Chapter 1, pp. 1-17 (1993).
Xiph.org Foundation, "OggVorbis: The Ogg Vorbis CODEC project," retrieved from the internet at http://www.xiph.org/ogg/vorbis/, Xiph.org, 4 pages (1994-2003).
Xiph.Org Foundation, "Vorbis I specification," Xiph.Org Foundation, 80 pages (1994-2004).

SYSTEM AND METHODS FOR DETERMINING ATTRIBUTES FOR ARITHMETIC OPERATIONS WITH FIXED-POINT NUMBERS

RELATED APPLICATIONS

The present application is a continuation of U.S. patent application Ser. No. 11/316,007 filed Dec. 22, 2005 and entitled A SYSTEM AND METHODS FOR DETERMINING ATTRIBUTES FOR ARITHMETIC OPERATIONS WITH FIXED-POINT NUMBERS, the contents of which are herein incorporated by reference.

FIELD OF THE INVENTION

The present invention relates to a system and method for determining attributes for arithmetic operations with fixed-point numbers, and, in particular, for determining attributes for arithmetic operations with fixed-point numbers in an environment for fixed-point algorithm development.

BACKGROUND

In conventional environments for fixed-point algorithm development, a user may have a number of options regarding how the precision of fixed-point numbers is handled for arithmetic operations. These options may be designated as "full precision" and "specify precision." With the "full precision" option, a computational tool automatically calculates how many digits are needed to retain full precision of the result of the operation and uses a word length that accommodates the number of digits needed to retain full precision of the result of the operation. The minimum word length and radix point of the result of the operation are automatically determined so that no loss of precision or overflow will occur. This level of specification minimizes the need for the user to specify a multitude of changing attributes when emulating calculation of a fixed-point arithmetic operation on a particular machine but often leads to attributes that are not realizable on the emulated machine.

With the "specify precision" option, a word length and radix point for results of fixed-point arithmetic operations are specified by the user. This level of specification typically allows the user to exactly emulate calculation of a fixed-point arithmetic operation on a particular machine, but may place a burden on the user to calculate all attributes, even where the attributes are subject to frequent change.

Unfortunately, conventional environments lack a method for specifying any level of specification between full specification by the user and full precision by the computational tool. Additionally, conventional simulation environments typically lack a method for relieving the burden on the user of specifying all attributes without requiring full precision by a computational tool, which may result in attributes that are not realizable on a given architecture.

In addition, prior environments allocate superfluous space for performing a series of arithmetic operations in a fixed-point algorithm environment. For example, when a series of arithmetic operations, such as a series of additions, is performed, conventional environments for fixed-point algorithm development add one digit to a word holding the result of the series of arithmetic operations for each iteration in the series. Therefore, an addition of two single digit numbers, such as 8 and 9, would allocate a maximum number of digits (two) for storing the first result (17). If another operation were performed on that sum, for example the addition of another single digit number, such as 6, to the first result (17), a prior environment would allocate another whole digit to hold the resulting second result (23), even though only two digits would be needed. When another operation, for example, the addition of another single digit number, such as 8, is performed on the second result (23) from the previous iteration, prior environments would add another whole digit for the result, resulting in a word length comprising four digits to hold the resulting third result (31), even though still only two digits would be needed. Therefore, prior limited computer environments provide an inefficient use of hardware resources.

SUMMARY OF THE INVENTION

The present invention greatly relieves the burden of specification of fixed-point attributes in fixed-point algorithm development, while simultaneously providing the ability to get the same results as any practical fixed-point algorithm in a faithful manner. Fixed-point arithmetic behavior is determined by the attributes of the fixed-point operands, coupled with arithmetic rules. The present innovation provides rules for setting attributes of fixed-point arithmetic operations that differ from conventional options. In a first conventional option, a user specifies all of the attributes of the results of fixed-point operations and this puts a difficult burden on the user. In a second conventional option, a computational tool always keeps full precision but this often results in attributes that are not realizable on a given architecture because the word length required for full precision grows too large to be stored in the given architecture. Intermediate rules like those provided by embodiments of the present invention allow the user to specify the boundaries and behavior that exactly emulate a fixed-point machine (either real or imagined) with a minimum amount of specification. These methods greatly enhance the ease of fixed-point algorithm development, while conserving resources. The methods can be applied broadly to all fixed-point algorithm development.

The illustrative embodiment of the invention may also provide efficient use of resources by efficiently allocating space for holding a changing result of a series of arithmetic operations. Rather than increment the number of digits in a word for storing the result for each iteration in the series of arithmetic operations, the illustrative embodiment of the invention preferably increases the number of digits at a rate of less than one digit for each arithmetic operation performed in the series of operations. For example, while the computational environment performs the series of arithmetic operations, the illustrative embodiment of the invention may provide a parameter, N, tracking the number of arithmetic operations that have already been performed in the series of arithmetic operations. The number N grows with each iteration of the series of arithmetic operations. The computational environment may increment the number of digits for holding the result at a rate proportional to $\log_b N$, where b is the base of the operands in the arithmetic operations. Therefore, number of digits storing a growing result of a series of arithmetic operations, calculated using a growth rate proportional to $\log_b N$, is less than the number of arithmetic operations performed, while sufficient to hold the growing result, and preferably only equal to the number of digits necessary to hold the result.

According to one aspect of the invention, a method in a computational device, is provided for determining a rate of growth of a number of digits in a word for storing a result of a series of arithmetic operations with fixed-point numbers, in an environment for fixed-point algorithm development. The method comprises the steps of providing a parameter for tracking a number of arithmetic operations performed in the series of arithmetic operations and calculating a growth rate for the number of digits representing the result during performance of the series of arithmetic operations based on the parameter. A medium holding executable steps for the method is also provided.

According to another aspect of the invention, a method for determining a number of digits in a word to be used for storing a result of a series of arithmetic operations with fixed-point numbers, in a computational device in an environment for fixed-point algorithm development is provided. The method comprises the steps of providing an initial number of digits for representing the result, and while performing the series of arithmetic operations, tracking N, where N is a number of arithmetic operations that have been performed in the series. The method further comprises the step of incrementing the number of digits in the word after an iteration in the series of arithmetic operations. The number of digits is not incremented with each iteration in the series of arithmetic operations performed. A medium holding executable steps for the method is also provided.

According to still another aspect of the invention, a system for determining attributes for a result of a series of arithmetic operations with fixed-point numbers, in an environment for fixed-point algorithm development, is provided. The system comprises a result of evaluating each iteration in the series of arithmetic operations with fixed-point numbers, the result comprising a plurality of digits, an indicator of a word length used for storing a plurality of digits representing the result and an evaluation component for storing at least one of the plurality of digits representing the result. The number of digits in the word storing the result is based on a number of digits in the operands, plus a number of digits based on and less than N, where N is a number of arithmetic operations that have been performed in the series of operations.

BRIEF DESCRIPTION OF THE DRAWINGS

These and other aspects of this invention will be readily apparent from the detailed description below and the appended drawings, which are meant to illustrate and not to limit the invention, and in which.

DETAILED DESCRIPTION OF THE INVENTION

The illustrative embodiment of the present invention concerns arithmetic operations with fixed-point numbers, such as in environments for fixed-point algorithm development, provided on a computational device. The illustrative embodiment of the present invention provides support for determining attributes for results of arithmetic operations with fixed-point numbers. The illustrative embodiment provides intermediate options that do not rely solely on the user or solely on the computational device to specify attributes of fixed-point arithmetic. The present invention provides scaling of fixed-point numbers to avoid overflow conditions and minimize quantization errors, and includes options for binary point-only or power-of-two scaling, as well as encoding schemes for non-binary points.

Several options are provided in the illustrative embodiment, although those skilled in the art will appreciate that other options are encompassed by the present invention. In a first option, full precision is ensured and fixed minimal word lengths are used. The word length is restricted to be one of a vector of available word lengths specified by a user. Alternatively, the scaling factor is restricted to be one of a vector of available scaling factors specified by a user. Either the word length or the placement of the radix point are automatically determined so that no overflow occurs. In a second option, the user specifies word length and the placement of a minimum radix point is automatically determined such that no loss of precision occurs. Hence, with this option, the least significant digits are preserved. In a third option, the user chooses the word length and the placement of a maximum radix point is automatically determined so that no overflow occurs, and thus the most significant digits are stored. In another embodiment, a word length for storing a result of a series of arithmetic operations, and/or a rate of growth of a word length for such a result during performance of the series of operations is determined so as to conserve resources and minimize hardware costs. Before continuing with the discussion below, it is helpful to first define the use of a few terms.

The term "fixed-point representation" refers to a method for representing numerical values and data types that have a set range and precision. Fixed-point numbers can be represented as real-world value=(slope×integer)+bias, where the slope can be expressed as slope=fractional slope×$2^{exponent}$. The slope and the bias together represent the scaling of the fixed-point number. Fixed-point data types can be defined by their word length, their fraction length, and whether they are signed or unsigned.

The phrase "result of an arithmetic operation with fixed-point numbers" refers to the full-precision result of evaluating an arithmetic operation on fixed-point representations of one or more operands. The result may comprise a plurality of bits and one or more of those bits may be selected to represent the entire result when the result is stored in a word.

The term "precision" refers to a measure of the smallest numerical interval that a fixed-point data type and scaling can represent, determined by the value of the number's least significant bit. The precision is given by the slope, or the number of fractional bits. The term resolution is sometimes used as a synonym for this definition. The precision of a fixed-point number is the difference between successive values representable by its data type and scaling, which is equal to the value of its least significant bit. The value of the least significant bit, and therefore the precision of the number, is determined by the number of fractional bits. A fixed-point value can be represented to within half of the precision of its data type and scaling. For example, a fixed-point representation with four bits to the right of the binary point has a precision of $2^{-4}$ or 0.0625, which is the value of its least-significant bit. Any number within the range of this data type and scaling can be represented to within $(2^{-4})/2$ or 0.03125, which is half the precision. This is an example of representing a number with finite precision.

The term "scaling factor" refers to a format used for a fixed-point number of a given word length and signedness. The slope and bias together form the scaling of a fixed-point number having a scale factor. Fixed-point numbers can be encoded according to the scheme: real-world value=(slope× integer)+bias, where the slope can be expressed as: slope=fractional slope×$2^{fixed\ exponent}$. The integer is sometimes called the stored integer. This is the raw number, in which the radix point assumed to be at the far right of the word. The negative of the fixed exponent may be referred to as the fraction length. The slope and bias together represent the scaling of the fixed-point number. In a number with zero bias, only the slope affects the scaling. A fixed-point number that is only scaled by binary point position is equivalent to a number in Slope-Bias representation that has a bias equal to zero and a fractional slope equal to one. This is referred to as binary point-only scaling or power-of-two scaling:

$$\text{real-world value}=\text{integer}\times 2^{fixed\ exponent}$$

or $$\text{real-world value}=\text{integer}\times 2^{-fraction\ length}$$

The present invention supports both binary point-only scaling and [Slope Bias] scaling. Although typical systems use binary number representations, the methods described below are not restricted to a particular physical implementation. In some embodiments, the methods described below may be applied to any number representation and to any number base. In other embodiments, the methods may be applied to operations involving a mix of fixed-point and floating-point operands.

Figure 1:
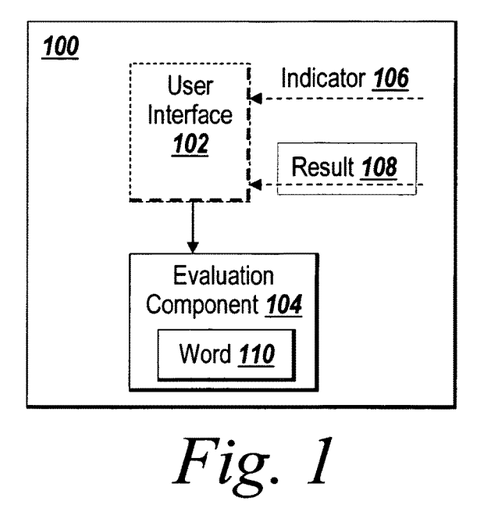
FIG. 1 is a block diagram depicting one embodiment of a system for determining an attribute for a result of an arithmetic operation.

FIG. 1 shows a block diagram of one embodiment of a system for determining an attribute for a result of an arithmetic operation. In one embodiment, the system resides on a computational device. Examples of a computational device include personal computer, network computer, workstation, or server. A computational device suitable for practicing the illustrative embodiment has a processor and storage. Furthermore, a fixed-point algorithm development environment is running on the processor. One example of such an environment is MATLAB® from The Mathworks, Inc., of Natick, Mass. Another example of such an environment is LabVIEW™ from National Instruments Corporation, of Austin, Tex. A copy of MATLAB®, LabVIEW™ or other such environments, may reside in the storage element of the computational device.

The system includes an evaluation component 104, an indicator 106, and a result 108. In some embodiments, the system includes a user interface. The user interface 102 may receive the indicator 106 and the result 108. The user interface 102 may comprise a command line interface. In another embodiment, the user interface 102 comprises a graphical user interface. The result 108 comprises a plurality of digits representing a result of evaluating a fixed-point arithmetic operation.

The indicator 106 may indicate a word length. As part of developing a fixed-point algorithm, an indicator of word length 106 may be stored in the storage element of the computational device. The indicator 106 specifies a plurality of possible word lengths for storing a plurality of digits representing a result of an arithmetic operation with fixed-point numbers. The indicator 106 may also or alternatively store an algorithm for determining a rate of growth of digits in a word storing a result for a series of arithmetic operations. These fixed-point numbers may be results of fixed-point arithmetic operations. In one embodiment, the indicator 106 comprises a plurality of possible word lengths containing a single word length, indicating that a single word length may be used. In another embodiment, the indicator 106 comprises a plurality of possible word lengths containing a vector of word lengths, indicating that word lengths are limited to the length of the values in the set. In still another embodiment, the indicator 106 stores an algorithm for determining and allocating space for holding a word representing a result of a series of arithmetic operations in a more efficient manner. The modes provided by an illustrative embodiment of the present invention enable a user to specify attributes of results of fixed-point arithmetic operations. In particular, they enable a user to specify how word length is to be set and to select how the computational device will determine the placement of the radix point in the plurality of digits representing the result of the arithmetic operation with fixed-point numbers. Thus, for such an arithmetic operation, the storage element will hold the result in words having word lengths dictated by the user and having radix points whose placements are determined by the computational device.

The evaluation component 104, which may be in communication with a user interface 102, determines a placement of a radix point in the result 108, responsive to the indicator 106 of how the placement of the radix point is to be determined, and determines to store, responsive to the determined placement of the radix point, at least one of the plurality of digits in a word 110, said word 110 having a length responsive to the received indicator 106 of word length. In one embodiment, the evaluation component 104 selects a word 110 in which to store at least one of a plurality of digits representing a result of evaluating an arithmetic operation with fixed-point numbers or a series of arithmetic operations with fixed-point numbers. The evaluation component 104 may alternatively select a word 110 having a length responsive to an indication of a fixed set of word lengths in the indicator 106. In some embodiments, the evaluation component 104 selects a word 110 having a length responsive to the indicator 106. In another embodiment, the evaluation component selects a word 100 having a length (i.e., number of digits) based on, and preferably less than, the number of arithmetic operations that have been performed in a series of arithmetic operations. The evaluation component may increase or otherwise alter the size of the word to accommodate a growing or changing result as the number of arithmetic operations performed in the series increases. The evaluation component 104 may store at least one of the most-significant digits in the plurality of digits representing the result 108. Alternatively, the evaluation component 104 may store at least one of the least-significant digits in the plurality of digits representing the result 108. In some embodiments, the evaluation component 104 selects a word 110 having a length responsive to a request to preserve a level of precision of the result 108.

The evaluation component 104 may select, responsive to the word 110, a word length for a second word storing a plurality of digits representing a result of evaluating a subsequent fixed-point arithmetic operation in the second word. In some embodiments, the evaluation component 104 stores an indicator of a length of used space remaining in the word 110. Preferably, the word length is selected such that no or a reduced amount of unused space is in the word. The length of the used space may be the number of digits in the word 110 occupied by stored digits representing the result of evaluating a first fixed-point arithmetic operation. In one of these embodiments, the evaluation component 104 compares the number of digits used in the word 110, as indicated by the indicator of the length of used space, with the result of evaluating the subsequent fixed-point arithmetic operation. The evaluation component 104 may determine to select for the second word a word length longer than the length of the word 110 after comparing the number of digits used in the word with the length of the word 110. Choosing a longer word length for the second word may ensure that there are sufficient digits available for storing the result of evaluating the subsequent fixed-point arithmetic operation in word 110.

In one embodiment, the indicator 106 indicates a scaling factor. The user interface 102 receives the indicator of scaling factor and the result. The evaluation component 104 determines a word length for a word 110 storing the plurality of digits representing the result 108 of evaluating the fixed-point arithmetic operation, based on the received indicator 106 of scaling factor, and for determining to store at least one of the plurality of digits in the word 110, responsive to the indicator 106 of scaling factor.

Figure 2:
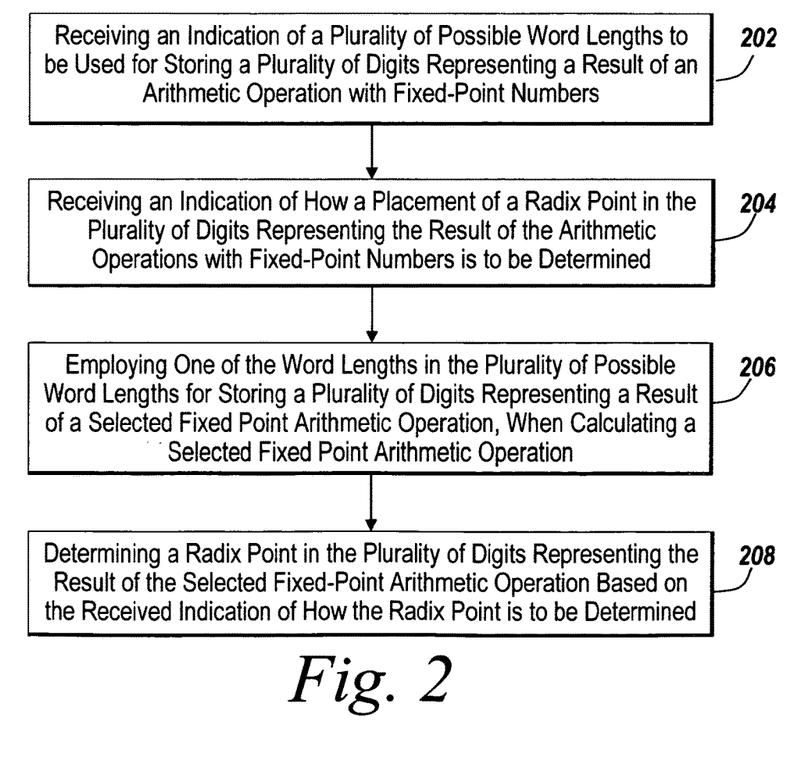
FIG. 2 is a flow diagram depicting one embodiment of the invention in which an attribute for a result of an arithmetic operation is determined.

FIG. 2 shows a flow diagram for one embodiment of the invention in which an attribute for a result of an arithmetic operation is determined. In a computational device, a method is provided for determining attributes for results of arithmetic operations with fixed-point numbers, in an environment for fixed-point algorithm development. An indication is received of a plurality of possible word lengths to be used for storing a plurality of digits representing a result of an arithmetic operation with fixed-point numbers (step 202). The indication may be received from a user. The user may transmit the indicator 106 to the system via the user interface 102. In some embodiments, the plurality of possible word lengths contains a single word length. In other embodiments, the plurality of possible word lengths contains a vector of word lengths. In still other embodiments, the word length may be expressed as a formula. In addition to receiving the indication, a request may also be received to preserve a level of precision when storing the result.

An indication is received of how a placement of a radix point in the plurality of digits representing the result of the arithmetic operation with fixed-point numbers is to be determined (step 204). A user may indicate how the placement of the radix point is to be determined. In one embodiment, the user indicates that the placement of the radix point should be determined such that no overflow occurs. In another embodiment, the user indicates that the placement of the radix point should be determined such that no loss of precision in the digits representing the result of the arithmetic operation occurs. In still another embodiment, the placement of the radix point is determined automatically.

One of the word lengths in the plurality of possible word lengths is employed for storing the plurality of digits representing the result of a selected fixed-point arithmetic operation when calculating the selected fixed-point arithmetic operation (step 206). In one embodiment, the word has a length selected responsive to a request to preserve the level of precision of the result. In another embodiment, the word has a length selected responsive to a request to prevent overflow when storing the result. In still another embodiment, the word has a length selected responsive to a characteristic of an operand used in evaluating the selected fixed-point arithmetic operation.

A placement of a radix point in the plurality of digits representing the result of the selected fixed-point arithmetic operation is determined based on the received indication of how the placement of the radix point is to be determined, when calculating a selected fixed-point arithmetic operation (step 208). A plurality of digits may represent a result of a selected fixed-point arithmetic operation. In one embodiment, a determination is made to store at least one of the plurality of digits in a word. In another embodiment, a determination is made to store either the most-significant digits or the least-significant digits of the result.

In some embodiments, an indicator of a length of used space used in the word is stored. The indicator identifies a number of digits used after storing the plurality of digits representing the result in the word. As described below, in one embodiment, a series of arithmetic operations using fixed-point numbers, such as a series of additions, is performed. The indicator may determine the number of digits in a word storing the result with each iteration of the series of operations based on the number of arithmetic operations already performed. To conserve resources, the indicator may reserve only the number of digits necessary for storing the result of each iteration. For example, the digits preferably grow at a selected optimized growth rate, rather than incrementing with each iteration in the series of arithmetic operations. In one embodiment, the digits grow at a rate proportional to $\log_b N$ for each iteration in the series of arithmetic operations, where b is the base of the operands and N is the number of arithmetic operations that have been performed in the series.

A determination is made as to whether to store a result of evaluating a subsequent selected fixed-point arithmetic operation in a second word having a word length of the same length as the word length of the first word, responsive to the indicator of the length of used space remaining in the word. The indicator of the length of used space remaining in the word may be used to determine whether, based on the number of digits in the word given the employed word length, there would be sufficient digits remaining in the second word to store the subsequent result. In one embodiment, a longer word length is chosen from the fixed set of possible word lengths for the length of the second word. In these embodiments, the result of evaluating the subsequent selected fixed-point arithmetic operation may then be stored in the second word since the increased word length ensures sufficient digits are available for storing the subsequent result.

Figure 3:
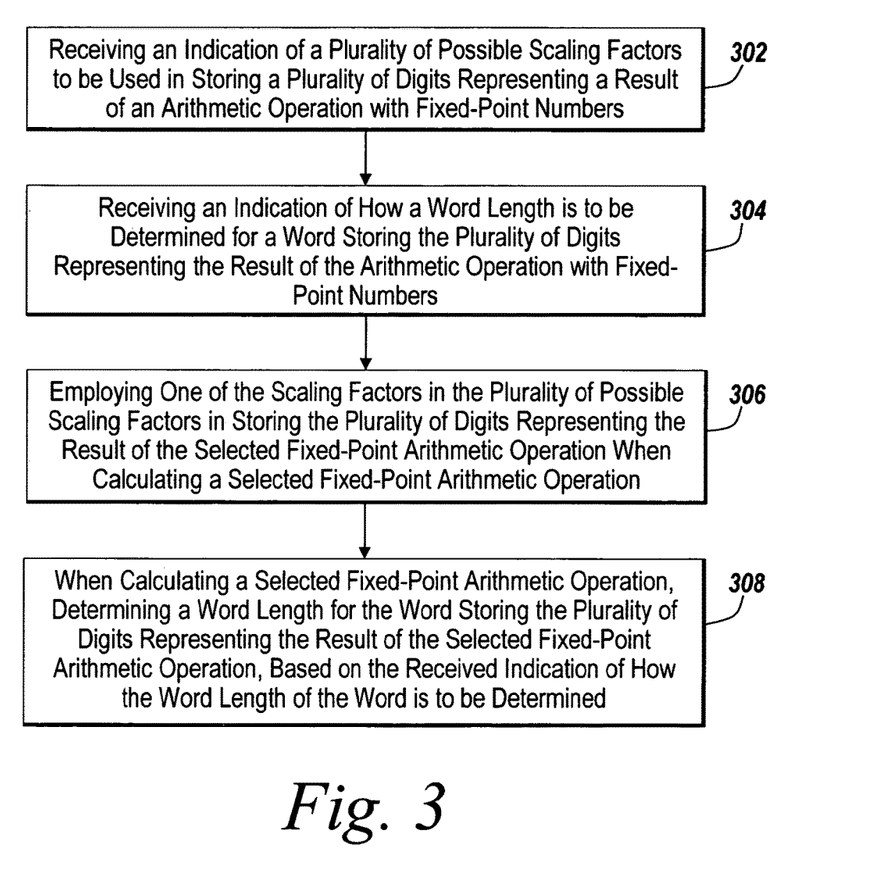
FIG. 3 is a flow diagram depicting a second embodiment of the invention in which an attribute for a result of an arithmetic operation is determined.

FIG. 3 is a flow diagram depicting a second embodiment of the invention in which an attribute of an arithmetic operation is determined. An indication is received of a plurality of possible scaling factors to be used in storing a plurality of digits representing a result of an arithmetic operation with fixed-point numbers (step 302). In one embodiment, the plurality of possible scaling factors contains a single scaling factor. In other embodiments, the plurality of possible scaling factors contains a vector of scaling factors.

An indication is received of how a word length is to be determined for a word storing the plurality of digits representing the result of the arithmetic operation with fixed-point numbers (step 304). A user may indicate how the word length is to be determined. In one embodiment, the user indicates that the word length should be determined such that no overflow occurs. In another embodiment, the user indicates that the word length should be determined such that no loss of precision in the digits representing the result of the arithmetic operation occurs.

When calculating a selected fixed-point arithmetic operation, one of the scaling factors in the plurality of possible scaling factors is employed in storing the plurality of digits representing the result of the selected fixed-point arithmetic operation (step 306). The scaling factor chosen may result in storage of the most significant digits of the result in the word. Alternatively, the scaling factor chosen may result in storage of the least significant digits of the result.

When calculating a selected fixed-point arithmetic operation, a word length is determined for the word storing the plurality of digits representing the result of the selected fixed-point arithmetic operation, based on the received indication of how the word length of the word is to be determined (step 308). A plurality of digits may represent a result of a selected fixed-point arithmetic operation. In one embodiment, a determination is made to store at least one of the plurality of digits in a word. In another embodiment, a determination is made to store either the most-significant digits or the least-significant digits of the result. In some embodiments, selecting the digits stored is responsive to a request for preventing overflow. In other embodiments, selecting the digits stored is responsive to a request for preserving precision.

FIG. 3 describes a method for selecting a word length given a scaling factor. The following is an example of syntax for arithmetic operations including a product operation and for a sum operation performed in this mode, in an environment used by a Fixed-Point Toolbox in MATLAB® from The Mathworks, Inc., of Natick, Mass.:

Suppose the scaling of the least-significant bit is fixed at $2^{-4}$, and the set of allowable word lengths is {8, 16, 24, 32, 40}. Let the rules for determining the attributes of the result of an arithmetic operation be defined by:

(a') If any of the operands is signed, then the result shall be signed.
(b') The number of digits in the word that stores the variable shall be chosen from the set {8, 16, 24, 32, 40}.
(c') If the result can be represented without overflow in a word length that is in the set of allowable word lengths, then choose the smallest word length from the set that can represent the result without overflow, and store the result in the least-significant bits of a word of that length.
(d') If the result cannot be represented without overflow in a word length that is in the set of allowable word lengths, then choose the largest word length from the set, and store up to that number of least-significant bits of the result in a word of that length.
(e') The scaling of the least-significant bit of the result shall be $2^{-4}$.

Let variable C be:
(1) signed;
(2) stored in an 8-bit word with $2^{-4}$ scaling of its least-significant bit;
(3) given that 7 bits out of the 8 are used with $2^{-4}$ scaling of the least-significant bit of the used bits; and
(4) given that the value of the binary digits is 0$\boxed{0110010}$ × $2^{-4}$=3.125≈π rounded to 7 bits. For this illustration, the 7 used bits have been highlighted by enclosing them in a box.

Let variable D be:
(1) signed;
(2) stored in an 8-bit word with $2^{-4}$ scaling of its least-significant bit;
(3) given that 7 bits out of the 8 are used with $2^{-4}$ scaling of the least-significant bit of the used bits; and
(4) given that the value of the binary digits is 0$\boxed{0101011}$ ×$2^4$=2.6875≈e rounded to 7 bits. For this illustration, the 7 used bits have been highlighted by enclosing them in a box.

Given the definitions of variables C and D from above, and the rules of arithmetic described in (a')-(e') from above, the following results for the sum S=C+D, and the product P=C×D can be determined.

The result S=C+D will:
be signed because both C and D are signed;
be stored in an 8-bit word because the full-precision result requires 4 integer bits to prevent overflow and (e') requires 4 fractional bits, we need at least 8 bits for the result, and 8 is in the set of allowable word lengths {8, 16, 24, 32, 40};
have scaling $2^{-4}$ from requirement (e');
store the knowledge that 8 bits were used, and the scaling of the least-significant bit of the used bits is $2^{-4}$;
have the value S=$\boxed{01011101}$ ×$2^{-4}$=5.8125, where the 8 used bits have been highlighted for this illustration by enclosing them in a box.

The result P=C×D will:
be signed because both C and D are signed;
be stored in a 16 bit word because the full-precision result requires 6 integer bits to prevent overflow and since (e') requires 4 fractional bits, we need at least 10 bits for the result, and 16 is the next higher word length in the set of allowable word lengths {8, 16, 24, 32, 40};
have scaling $2^{-4}$ from requirement (e');
store the knowledge that 10 bits were used, and the scaling of the least-significant bit of the used bits is $2^{-4}$;
have the value P=000000$\boxed{0010000110}$ ×$2^{-4}$=8.375, where the 10 used bits have been highlighted for this illustration by enclosing them in a box.

Figure 4:
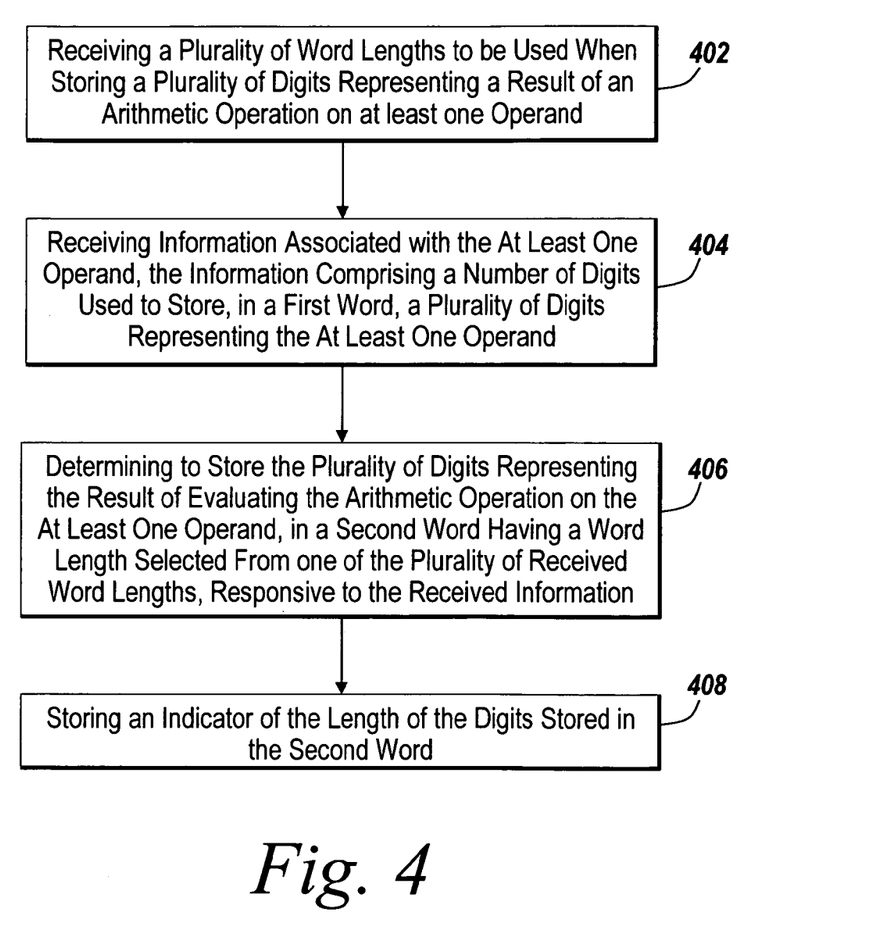
FIG. 4 is a flow diagram depicting one embodiment of the invention in which an attribute preventing overflow of an arithmetic operation is determined.

FIG. 4 is a flow diagram depicting one embodiment of the invention in which an attribute preventing overflow of an arithmetic operation is determined. In a computational device, a plurality of word lengths is received for use when storing a plurality of digits representing a result of an arithmetic operation on at least one operand (step 402). The plurality of word lengths may comprise a vector of word lengths. Each word length may indicate a number of available digits in which a word may store one or more digits representing a result of evaluating a first arithmetic operation.

Information associated with the at least one operand is received, the information comprising a number of digits used to store, in a first word, a plurality of digits representing the at least one operand (step 404). In some embodiments, a plurality of digits representing the at least one operand is received, the plurality of digits chosen to represent the least significant digits of the operand. The plurality of digits representing the at least one operand may alternatively represent the most significant digits of the operand.

In one embodiment, the information indicates whether the operand is a signed variable, containing a positive number, a negative number, or zero, or an unsigned variable, containing a positive number or zero. In another embodiment, the information indicates the number of digits in the word that stores the operand and the scaling of the least-significant digit of the word that stores the operand. In still another embodiment, the information indicates the number of digits used and the scaling of the least-significant digit of the used digits. The scaling of the least-significant digit of the used digits may or may not be the same as the scaling of the least-significant digit of the word that stores the variable. The location of the used digits within the word that stores the variable is a function of the scaling of the used digits. Hence, the location of the used digits can be derived from the number of digits used and the scaling of the used digits. The number of used digits must be at least as large as the number of digits in the word that stores the variable. In the case of signed representations, the most significant unused digits of the stored word may be sign extended (for example, in two's-complement binary representations). In yet another embodiment, the information indicates the value of the digits in the word that stores the operand.

A determination is made to store the plurality of digits representing the result of evaluating the arithmetic operation on the at least one operand, in a second word having a word length selected from one of the plurality of received word lengths, responsive to the received information (step 406). The attributes of the result of an arithmetic operation on one or more operands, and the attributes of the second word storing the result, may be a function of the number of digits used to store the operands and the scaling of the least-significant digit of the used digits. The attributes of a result may be further influenced by other rules, such as choosing the stored word length from a set of allowable word lengths, keeping the most-significant digits of the result, or keeping the least-significant digits of the result. These rules may be used individually or in conjunction with one another.

In one embodiment, a word length is selected from one of the plurality of word lengths having a length at least as long as the number of digits used to store the plurality of digits representing the at least one operand. In some embodiments, a selection is made for the word length from one of a plurality of word lengths responsive to a determined minimum effective word length.

A determination may be made to store the plurality of digits representing the result of evaluating the arithmetic operation on the at least one operand, in a second word having a longer word length than the length needed to store the plurality of digits representing the at least one operand. In other embodiments, a determination is made as to whether the word length of the plurality of digits representing the result of evaluating the arithmetic operation on the at least one operand exceed the length of the longest word length in the received plurality of word lengths. If the longest word length available from the received plurality of word lengths is not capable of storing all of the plurality of digits representing the result, a determination may be made to store the plurality of digits representing the least significant digits of the result. For example, if a full-precision result is 50 bits, and the maximum word length in the finite set of word lengths is 40, then the most-significant 40 bits of the result are stored in a 40 bit word. The determination may also be made to store the plurality of digits representing the most significant digits of the result. For example, if a full-precision result is 50 bits, and the maximum word length in the finite set of word lengths is 40, then the least-significant 40 bits of the result are stored in a 40 bit word.

An indicator is stored of the length of the digits stored in the second word (step 408). In one embodiment, the digits stored in the second word may be used as an operand in a subsequent arithmetic operation. In this embodiment, the indicator may be sent as the information about the at least one operand.

In some embodiments, a minimum effective word length is determined when selecting the word length of the word. The determination of the minimum effective word length may be made responsive to the number of digits in the result of evaluating the arithmetic operation. The determination of the minimum effective word length may also be made responsive to a word length in the plurality of received word lengths. In one embodiment, the selection of a word length from the plurality of word lengths is made responsive to the determined minimum effective word length.

In one embodiment of the present invention, a system of arithmetic is binary-point scaling with two's-complement binary arithmetic. Given two operands, A and B, variable A may be:

(1) signed;
(2) stored in a signed 16-bit word with $2^{-7}$ scaling of its least-significant bit;
(3) given that 8 bits out of the 16 are used with $2^{-7}$ scaling of the least-significant bit of the used bits; and
(4) given that the value of the binary digits is 00000000$\boxed{01100101}$ $\times 2^{-7}=0.78125\approx\pi/4$ rounded to 8 bits. For this illustration, the 8 used bits have been highlighted by enclosing them in a box.

Variable B may be:

(1) signed;
(2) stored in a signed 16-bit word with $2^{-7}$ scaling of its least-significant bit;
(3) given that 10 bits out of the 16 are used with $2^{-7}$ scaling of the least-significant bit of the used bits is; and
(4) given that the value of the binary digits is 000000$\boxed{0101011100}$1 $\times 2^{-7}=2.71875\approx e$ rounded to 10 bits. For this illustration, the 10 used bits have been highlighted by enclosing them in a box.

The rules for determining the attributes of the result of an arithmetic operation are as follows:

(a) If any of the operands is signed, then the result shall be signed.
(b) The number of digits in the word that stores the variable shall be chosen from the set {8, 16, 24, 32, 40}.
(c) If the result can be represented without loss of precision in a word length that is in the set of allowable word lengths, then choose the smallest word length from the set that can represent the result in full precision, and store the result in the least-significant bits of a word of that length.
(d) If the result cannot be represented without loss of precision in a word length that is in the set of allowable word lengths, then choose the largest word length from the set, and store up to that number of least-significant bits of the result in a word of that length.

Given the definitions of variables A and B from above, and the rules of arithmetic described in (a)-(d) from above, the following results for the sum S=A+B, and the product P=A×B can be determined.

The result S=A+B will be signed because both A and B are signed;
be stored in a 16-bit word with scaling $2^{-7}$ because the minimum word length for the full-precision sum requires 11 bits and 16 bits is the next word length in the set of allowable word lengths {8, 16, 24, 32, 40}, and the scaling is $2^{-7}$ because the result is to be stored in the least-significant bits;
store the knowledge that 11 bits were used, and the scaling of the used bits is $2^{-7}$;
have the value S=00000$\boxed{00111000001}$10 × $2^{-7}$=3.5078125, where the 11 used bits have been highlighted for this illustration by enclosing them in a box.

The result P=A×B will
be signed because both A and B are signed;
be stored in a 24-bit word with scaling $2^{-14}$ because the minimum word length for the full precision product requires 18 bits and 24 bits is the next word length in the set of allowable word lengths {8, 16, 24, 32, 40}, and the scaling is scaling $2^{-14}$ because the result is to be stored in the least-significant bits;
store the knowledge that 18 bits were used, and the scaling of the used bits is $2^{-14}$;
have the value P=000000$\boxed{001000100101001100}$ × $2^{-14}$=2.145263671875, where the 18 used bits have been highlighted for this illustration by enclosing them in a box.

The embodiment described above illustrates a rule that computes the fixed-point attributes of evaluating a result of an arithmetic operation responsive to the fixed-point attributes of the operands, without regard to the values of the operands. In other embodiments, a rule may compute the fixed-point attributes of a result based on the values of the operands. For example, given two unsigned four-bit operands, E=0001×$2^0$=1 and F=0010×$2^0$=2, then using the knowledge of the values of E and F, the sum E+F=11×$2^0$=3 may be expressed in two bits, and the product E×F=10×$2^0$=2 may also be expressed in two bits.

The embodiment depicted by FIG. 4 may, in some embodiments, be described as "Stepped Precision, Minimum Steps." In practice, an embodiment of the method described in FIG. 4 is very useful when applied to a series of arithmetic operations. For example, when a sum is carried out in series, A+B+C, the first intermediate sum $S_1$=A+B is computed and stored in a word, and the number of used digits and scaling is stored. Then, when the subsequent sum is computed, $S_2$=$S_1$+C, the number of used digits and scaling in $S_1$ can be utilized to determine a minimum representation for $S_2$. The following is an example of syntax for such a series of arithmetic operations including a product operation and for a sum operation performed in this mode, in an environment used by a Fixed-Point Toolbox in MATLAB® from The Mathworks, Inc., of Natick, Mass.:
a=fi(pi,true,8)
a=3.1562 s8,5
b=fi(exp(1),true,8)
b=2.7188 s8,5
c=fi(0.9,true,8)
c=0.8984 s8,7
F=fimath('OverflowMode','Wrap','RoundMode','floor', 'CastBeforeSum',false);
F.ProductMode='MinimumSteps;
F.ProductSteps=[8 16 32 48];
F.SumMode='MinimumSteps';
F.SumSteps=[8 16 32 48];
a.fimath=F;
b.fimath=F;
c.fimath=F;

In this embodiment, a user has defined fixed-point variables a, b, and c. Each variable is stored as signed (true), with 8-bit word lengths. None of the variables a, b, or c specify the number of fractional bits to use, and so the number of fractional bits is chosen to maximize precision and avoid overflow. Variable a approximates π to 8 bits of precision. Variable b approximates e to 8 bits of precision. Variable c approximates 0.9 to 8 bits of precision. The product abc needs a 24-bit word length to represent the value exactly, so it the word length is stepped up to 32 bits and it is remembered that only 24 bits of the 32 available bits are needed. The 24-bit minimum word length is used to calculate the word length for the next operation.

The sum a+b needed a 9-bit word length to represent the value exactly, and it stepped up to 16 bits and remembered that it only needed 9 bits. The 9-bit minimum word length is used to calculate the word length of the next sum (a+b)+c. The minimum word length for (a+b)+c is 12-bits (after aligning the binary points), so the next step of 16 bits is chosen.

Figure 5:
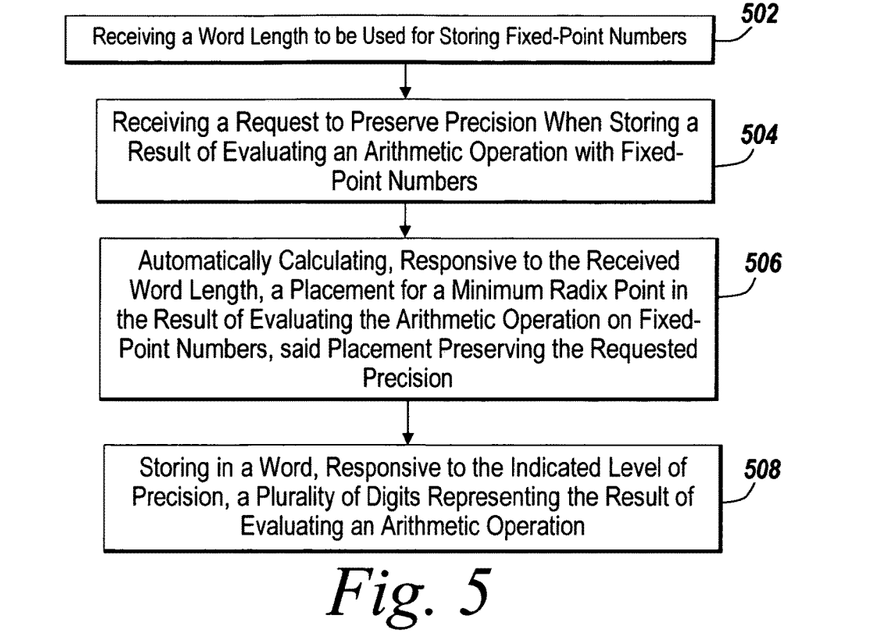
FIG. 5 is a flow diagram depicting one embodiment of the invention in which an attribute preventing loss of precision of an arithmetic operation is determined.

FIG. 5 is a flow diagram depicting one embodiment of the invention in which an attribute preventing loss of precision of an arithmetic operation is determined. A word length is received from a user to be used for storing fixed-point numbers (step 502). The word length may indicate a plurality of digits in a word which are available for storage of a result of evaluating an arithmetic operation with fixed-point numbers. In some embodiments, a plurality of possible word lengths containing a vector of word lengths is received.

A request to preserve precision when storing a result of evaluating an arithmetic operation with fixed-point numbers is received (step 504). An indicator of a number of radix places to preserve may be received. In some embodiments, an indicator of which fractional digits to store from a plurality of digits representing the result of evaluating the arithmetic operation is received.

A placement for a minimum radix point in the result of evaluating the arithmetic operation on fixed-point numbers, is automatically calculated, responsive to the received word length, said placement responsive to the request for prevention of loss of precision (step 506). A placement of a minimum radix point in a result of evaluating a first arithmetic operation may be automatically calculated. If so, the word length is specified by the user and the placement of the minimum radix point is automatically determined such that the least-significant digits are stored in the word having the specified word length and no loss of precision will occur. In some embodiments, preventing loss of precision may result in overflow.

A word stores, responsive to the request to prevent loss of precision, a plurality of digits representing the result of evaluating the arithmetic operation (step 508). In one embodiment, each of the digits representing the result are stored in the word until the word overflows. In another embodiment, each of the digits representing the result are

|   | Binary | Decimal | Type | Minimum Type |
|---|---|---|---|---|
| A | 011.00101 | 3.15625 | S8,5 | S8,5 |
| B | 010.10111 | 2.71875 | S8,5 | S8,5 |
| C | 0.1110011 | 0.898438 | S8,7 | S8,7 |
| a * b | 001000.1001010011 | 8.58105 | S16,10 | S16,10 |
| (a * b) * c | 000000000000111.10110101101001001 | 7.70954 | S32,17 | S24,17 |
| a + b | 00000000101.11100 | 5.875 | S16,5 | S9,5 |
| (a + b) + c | 000000110.1100011 | 6.77344 | S16,7 | S12,7 | stored in the word resulting in the word having a length longer than the specified word length.

In an embodiment where the user selects a word length for a result that is not in the finite set of word lengths, the next higher word length may be used to store the result in the least significant digits, the selected word length is stored for use in a subsequent computation. For example, if the user selects 28 bits, then store the result in the least-significant 28 bits of a 32-bit word, and remember that only 28 bits were used and that they are stored in the least-significant bits. If the selected word length is larger than the largest word length in the finite set of word lengths, then the largest word length in the finite set of word lengths is used and the least significant digits of the result are stored. For example, if the user selects 50 bits, and the maximum word length in the finite set of word lengths is 40, then the least-significant 40 bits of the result are stored in a 40 bit word.

The embodiment depicted by FIG. 5 may, in some embodiments, be described as "Keep Least Significant Bits (KeepLSB) Mode." In this mode, the word lengths are specified and the least-significant bits of results are kept. This mode models the behavior of integer operations in the C language. The following is an example of syntax for a product operation and for a sum operation performed in this mode, in an environment used by a Fixed-Point Toolbox in MATLAB® from The Mathworks, Inc., of Natick, Mass.:
F.ProductMode='KeepLSB';
F.ProductWordLength=12;
F.SumMode='KeepLSB';
F.SumWordLength=12;
a.fimath=F;
b.fimath=F;

|  | Binary | Decimal | Type | Comments |
|---|---|---|---|---|
| a | 011.00101 | 3.15625 | s8,5 |  |
| b | 010.10111 | 2.71875 | s8,5 |  |
| a * b | 00.1001010011 | 0.581055 | s12,10 | Overflow |
| a + b | 0000101.11100 | 5.875 | s12,5 |  |

In the example above, the product word-length has been specified as 12 bits to model the product register in a particular device. The product fraction-length is the sum of the fraction lengths of the operands. In this case, each operand had 5 fractional bits, so the product fraction-length is 10 bits. In this mode, all 10 fractional bits are preserved but overflow occurs because the full precision result requires 6 integer bits, and there are only 2 integer bits in the product. The sum word-length has been specified as 12 bits to model the sum register in our device. The sum fraction-length is aligned with the fraction lengths of the operands, and all least-significant-bits are kept in this mode. In this case, both operands had 5 fractional bits, so the sum has 5 fractional bits. The full precision result requires 4 integer bits, and we have 7 integer bits, so no overflow occurs in the sum.

Figure 6:
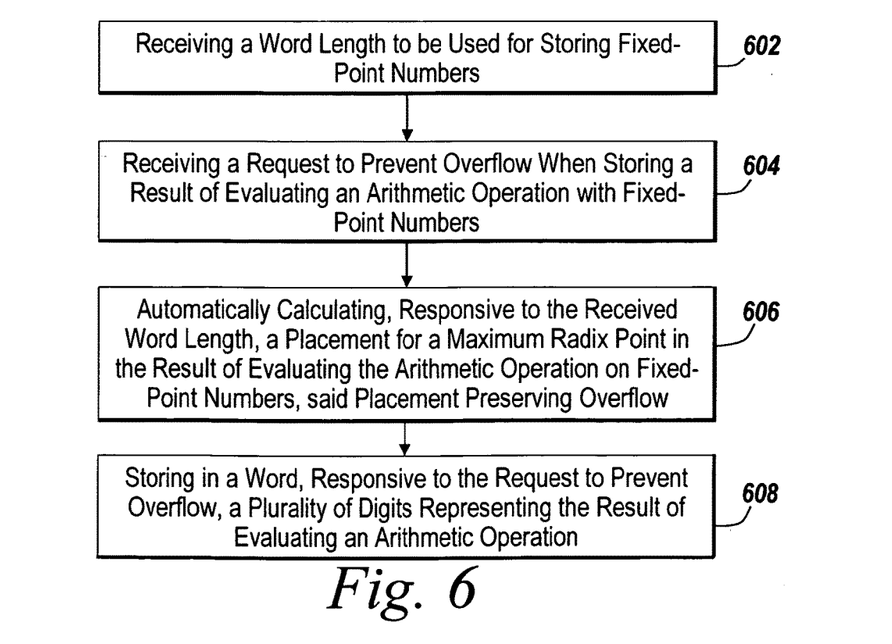
FIG. 6 is a flow diagram depicting a second embodiment of the invention in which an attribute preventing overflow of an arithmetic operation is determined.

Referring now to FIG. 6, a flow diagram depicts one embodiment of the invention in which an attribute preventing overflow is determined when performing arithmetic operations with fixed-point numbers in an environment for fixed-point algorithm development. A word length is received from a user to be used for storing fixed-point numbers (step 602). The word length may indicate a plurality of digits in a word which are available for storage of a result of evaluating an arithmetic operation with fixed-point numbers. In some embodiments, a plurality of possible word lengths containing a vector of word lengths is received.

A request is received to prevent overflow when storing a result of evaluating an arithmetic operation with fixed-point numbers (step 604). In one embodiment, the request is received from a user. A maximum number of digits representing the result are stored in the word but, due to the fixed word length for prevention of overflow, not all of the digits representing the result may be stored. Therefore, in some embodiments, preventing overflow may result in a loss of precision.

A placement for a maximum radix point in the result of evaluating the arithmetic operation on fixed-point numbers is automatically calculated (step 606). The automatic calculation may be responsive to the received word length. The placement of the maximum radix point may prevent overflow.

A word stores a plurality of digits representing the result of evaluating the arithmetic operation. The length of the word may be chosen responsive to the request to prevent overflow and to the received word length. In an embodiment where the user selects a word length for a result that is not in the finite set of word lengths, then the next higher word length may be used for the word storing the result in the most significant digits, and the selected word length is stored for use in a subsequent computation. For example, if the user selects 28 bits, then store the result in the most-significant 28 bits of a 32-bit word, and remember that only 28 bits were used and that they are stored in the most-significant bits. If the selected word length is larger than the largest word length in the finite set of word lengths, then the largest word length in the finite set of word lengths is used and the most significant digits of the result are stored. For example, if the user selects 50 bits, and the maximum word length in the finite set of word lengths is 40, then the most-significant 40 bits of the result are stored in a 40 bit word.

The embodiment depicted by FIG. 6 may, in some embodiments, be described as "Keep Most Significant Bits (KeepMSB) Mode." In these embodiments, the word length is specified, and the most-significant bits of the results of the product or sum are kept. Precision may be lost but overflow is prevented. This mode models the behavior of many DSP devices where the product and sum are kept in double-wide registers and the programmer chooses to transfer the most-significant bits from the registers to memory after each operation. This behavior also models, for example, the Zilog Z893xx, where the multiplier accepts 16-bit operands, but produces a 24-bit result instead of the 32-bits that would be necessary for an exact product. The following is an example of syntax for a product operation and for a sum operation performed in this mode, in an environment used by a Fixed-Point Toolbox in MATLAB® from The Mathworks, Inc., of Natick, Mass.:
F.ProductMode='KeepMSB';
F.ProductWordLength=12;
F.SumMode='KeepMSB';
F.SumWordLength=12;
a.fimath=F;
b.fimath=F;

|  | Binary | Decimal | Type | Comments |
|---|---|---|---|---|
| a | 011.00101 | 3.15625 | s8,5 |  |
| b | 010.10111 | 2.71875 | s8,5 |  |
| a * b | 001000.100101 | 8.57812 | s12,6 | Precision loss |
| a + b | 0101.11100000 | 5.875 | s12,8 |  |

In the example above, a product word-length of 12 bits has been specified to model the product register in a particular device. The full-precision product requires 6 integer bits, and so the fraction length of the product is adjusted to accommodate all 6 integer bits. No overflow occurs, but precision is lost because the full-precision product requires 10 fractional bits. The sum word-length has been specified as 12 bits to model the sum register in a device. The full-precision sum requires 4 integer bits, so the fraction length of the sum is adjusted to accommodate all 4 integer bits. The full-precision sum requires only 5 fractional bits; in this case we have 8, so there is no loss of precision.

Figure 7A:
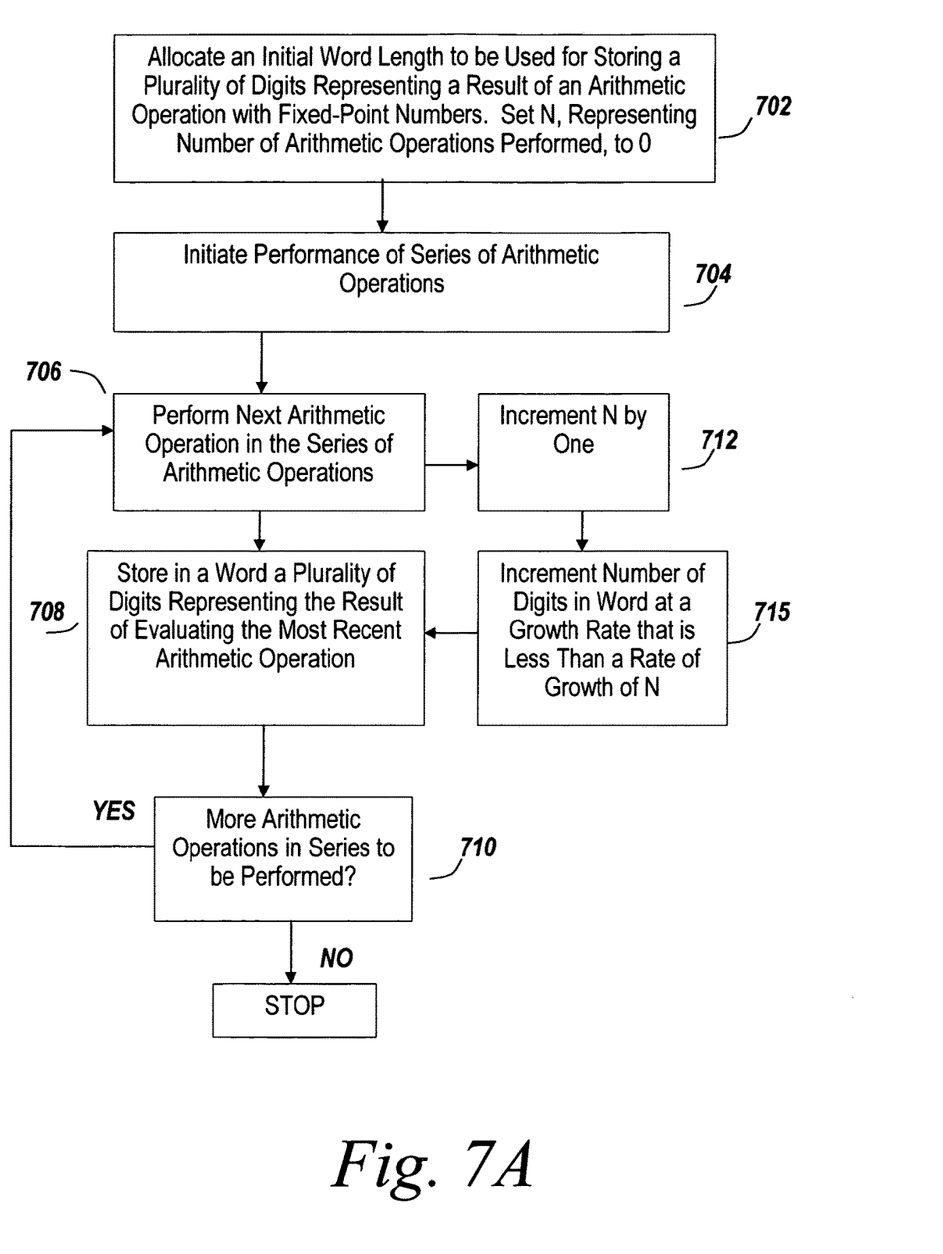
FIGS. 7A and 7B are flow diagrams depicting a method for determining a number of digits allocated for storing a result of a series of arithmetic operations according to an illustrative embodiment of the invention.
Figure 7B:
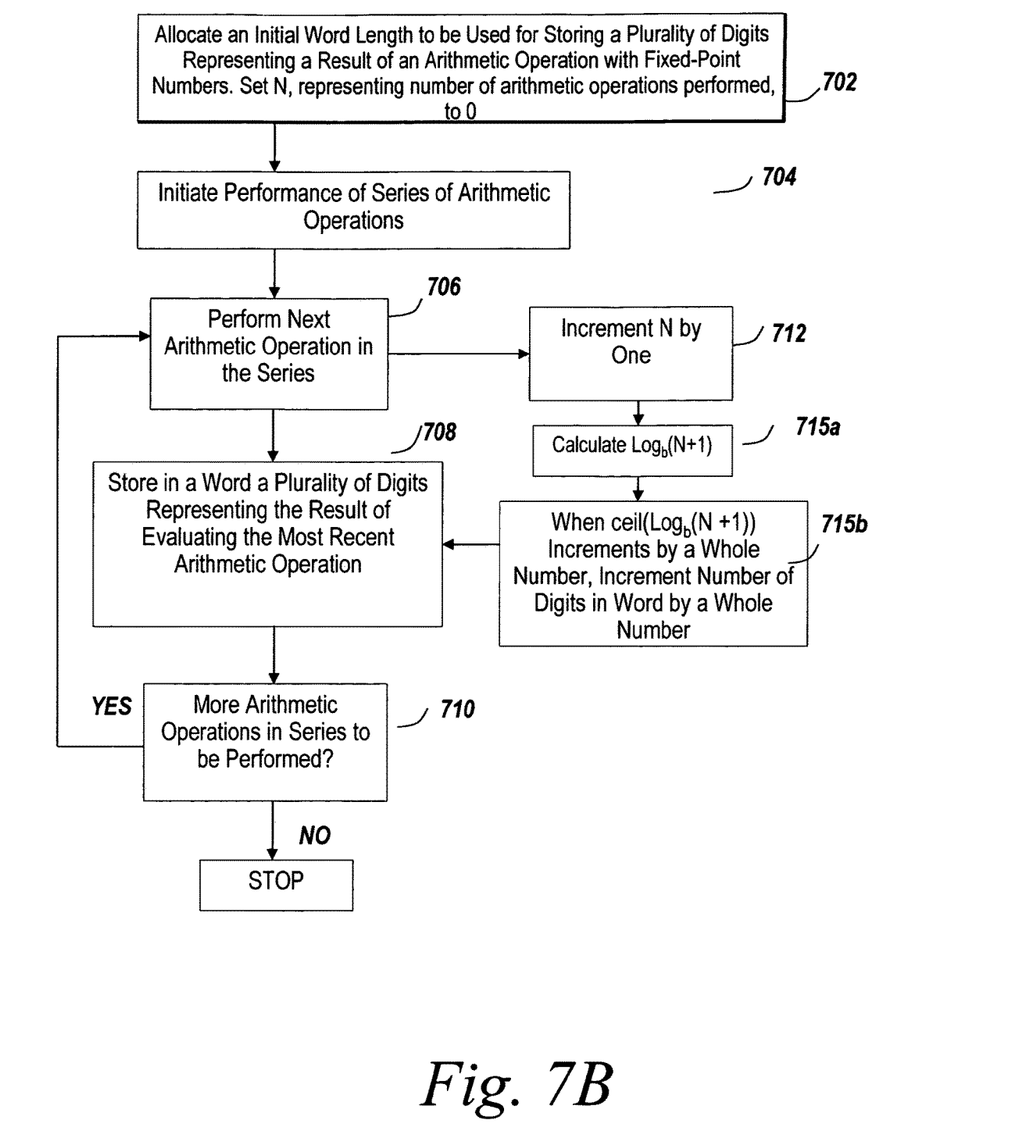

FIGS. 7A and 7B are flow diagrams depicting another embodiment of the invention in which a length (i.e., number of digits) and/or a growth rate of a word storing a changing result of a series of arithmetic operations during the performance of the series of arithmetic operations is determined. Unlike prior environments, the word storing the result does not increase a word storing a result of an arithmetic operation by one or more digits with each iteration in the series of arithmetic operations. Rather, the word length increases at a growth rate that is less than the rate at which the arithmetic operations are performed. In this manner, excess, unused storage space is reduced or eliminated.

In step 702, an initial word for storing a result and having an initial number of digits is allocated in the storage element in the computational device. The initial number of digits in the initial word may be any suitable number, including zero, one or a plurality of digits suitable for accommodating an initial arithmetic operation in the series of arithmetic operations. As described above, the plurality of digits are used to represent a result of an arithmetic operation, such as addition and subtraction, with fixed-point numbers. In step 702, a parameter, N, for tracking the number of arithmetic operations performed thus far, is initialized at zero.

In step 704, a series of arithmetic operations is initiated. The series of arithmetic operations preferably comprise addition with positive numbers or negative numbers (i.e., subtraction).

The series of arithmetic operations may be an algorithm where the number of operations to be performed ahead of time is known. An example of such a series is:
for k=1:M
a=a+x(k);
k=k+1;
end In another embodiment, the number of iterations is not known ahead of time, making it difficult to allocate a suitable amount of storage space for holding the growing result. For example for an algorithm:
while "condition"
a=a+value of B
end In both types of algorithms, the variable "a" will grow in length at a rate that is less than the number of iterations in the series of arithmetic operations during 1:M or during the occurrence of the condition.

The "condition" may be any condition having a determined or indeterminate termination, such as "while a button is not pressed." For example, the algorithm may calculate a compounding value of a stock price (B) or other value during the condition. The algorithm may be any suitable series of arithmetic operations.

In step 706, the computational device evaluates the first, or next, arithmetic operation in the series. After performing that iteration, the result of the most recent arithmetic operation is stored in a word as a plurality of digits representing the result in step 708.

In step 710, the computational device determines whether more arithmetic operations remain to be performed in the series. If so, the computational device loops back to step 706 to perform the next arithmetic operation in the series and step 712 to increment N by one. Otherwise, the computational device stops and outputs the final result.

The system determines the number of digits and/or the growth rate of the number of digits to be used to store the result in a word in step 708 based on the number N of arithmetic operations that have already been performed in the series. With each iteration in the series of arithmetic operations in step 706, the system increments the number N by one to track the number of arithmetic operations that have been performed. In step 715, the number of digits in the word is incremented at a growth rate that is less than a rate of growth of N. Steps 712 and 715 occur simultaneous with or immediately after step 706, and the system employs the number of digits as calculated in step 715 to store the result calculated in step 706.

According to the illustrative embodiment of the invention, the growth rate of the number of digits in the word (per arithmetic operation performed) is less than the growth rate of the number N, i.e., the system does not add a new digit each time N is incremented (i.e., each time an arithmetic operation is performed).

In one embodiment, the system increments the number of digits only when another digit is required to hold the result.

In another embodiment, as shown in FIG. 7B, the growth rate of the digits may be calculated by calculating the logarithm of the parameter N+1 (or of N) to the base of the base in which the arithmetic operations are calculated in step 715a. In this manner, the growth rate over N iterations is proportional to $\log_b N$, where b is the base and N is the number of arithmetic operations already performed. For example, the number of digits of growth during performance of a series of arithmetic operations may be less than or equal to the following formula: $\text{ceil}(\log_b(N+1))$, where $\text{ceil}(x)$ denotes the nearest integer greater than or equal to x. In this manner, the number of digits in a word for storing a result may be incremented when $\text{ceil}(\log_b(N+1))$ increments by a whole number. Other formulas that are proportional to $\log_b N$ may also be used to calculate a growth rate and number of digits for storing a result of a series of arithmetic operations.

For example, in base 10 arithmetic, when N is equal to 10 arithmetic operations, the logarithm of N is 1, indicating that the word storing the result of the 10 arithmetic operations grows at a rate of one digit over the course of the 10 arithmetic operations. When N grows to 100 arithmetic operations, the logarithm of N is 2, indicating that the word storing the result of the 100 arithmetic operations grows at a rate of two digits over the course of the 100 arithmetic operations. When N grows to 1000 arithmetic operations, the logarithm of N is 3, indicating that the word storing the result of the 1000 arithmetic operations grows at a rate of three digits over the course of the 1000 arithmetic operations. The growth rate allocated by using the logarithm of the number of operations performed corresponds to the maximum number of digits that would be needed to a result of a series of arithmetic operations.

In step 715b, the system increments the number of digits in a word used to store, in step 708, a result of a recent arithmetic operation when $\text{ceil}(\log_b(N+1))$ increments by a whole number. Alternatively, the number of digits may be incremented when the logarithm of N is equal to a whole number or using another suitable algorithm. For example, for base 2 arithmetic, the system will add another digit (i.e., a bit in base 2 arithmetic) to the initial word for storing the result after or immediately before two arithmetic operations in a series (when $\log_2 2$ is equal to one or when ceil($\log_2(1+1)$) is equal to 1). Preferably, the system allocates sufficient bits for storing the results of the first two arithmetic operations. Alternatively, the system may add a bit after one operation and after two operations. The system adds another digit after four arithmetic operations in a series (when $\log_2 N=4$ is equal to two). A third digit is added after eight arithmetic operations in a series (when $\log_2 8$ is equal to three), and a fourth digit is added to the word for storing the result after sixteen arithmetic operations in a series (when $\log_2 16$ is equal to four), and so on. Thus, the growth rate of the digits varies depending on the number of operations that have been performed. As the number of iterations grows, the growth rate is proportional to the logarithm of the number of iterations, so that fewer digits are added the larger the number of arithmetic operations. As described above, the system does not add a digit with each iteration.

The system may employ any base for performing the arithmetic operations and is not limited to base 2 or base 10 arithmetic.

When the number of digits in the operands of an arithmetic operation in the series is different, the growth rate of the number of digits of the result depends on both the number of arithmetic operations performed in the series, and the number of digits in each operand. For example, when a two-digit number, such as 85, is added to a three-digit number, such as 925, the result grows to a four-digit number of 1010. If this four digit number is added to a six-digit number, such as 999999, the result grows to a seven digits number of 1001009. Thus, the algorithm for tracking the growth rate of the digits in the result of a series of arithmetic operations increases for each additional digit in the larger operand over the smaller operand in an arithmetic operation.

Alternatively, each operand may be allocated with a maximum number digits based on the largest number of digits in an operand in the series. For example, the number "6" may be written as 0006, with four digits, when the maximum number of digits in an operand for a series of arithmetic operations is four. In this manner, because all operands have the same number of digits, the growth rate does not depend on the number of digits in each operand, and can be calculated as growing proportional to the result of the calculation $\log_b N$, as described above.

As described above, the invention provides significant cost savings in terms of efficiently allocated storage for storing a growing result of a series of arithmetic operations. For example, in prior environments, a sum of 1000 base 10 arithmetic operations would utilize 1000 digits for storing the result. In contrast, the illustrative embodiment of the invention utilizes only those digits needed to store the actual result. In one illustrative embodiment, the system grows the digits from the initial word length by four (i.e., $\log_{10} 1000$), resulting in significant savings. A first digit is added after 1 arithmetic operation. A second digit is added after 10 arithmetic operations (when $\log_{10} 10$ is equal to one, or ceil($\log_{10} 11$) increments by a whole number). A third digit is added after 100 arithmetic operations ($\log_{10} 100$ is equal to two, or when ceil($\log_{10} 101$) increments by a whole number). The fourth digit is added after 1000 arithmetic operations ($\log_{10} 1000$ is equal to three, or ceil($\log_{10} 1001$) increments by a whole number). Thus, the rate of growth is proportional to $\log_{10} N$, where N is the number of arithmetic operations.

The illustrative method for determining attributes, such as a number of digits for storing a result, for operations with fixed-point numbers may be executed in any suitable environment for fixed-point algorithm development, including a simulation environment. For example, the method may be used in a simulation environment to determine optimal parameters for applications executing therein.

The present invention may be provided as one or more computer-readable programs embodied on or in one or more mediums. The mediums may be a floppy disk, a hard disk, a compact disc, a digital versatile disc, a flash memory card, a PROM, a RAM, a ROM, or a magnetic tape. In general, the computer-readable programs may be implemented in any programming language. Some examples of languages that can be used include C, C++, C#, or JAVA. The software programs may be stored on or in one or more articles of manufacture as object code.

While the invention has been shown and described with reference to specific preferred embodiments, it should be understood by those skilled in the art that various changes in form and detail may be made therein without departing from the spirit and scope of the invention as defined by the following claims.

What is claimed is:

1. A method performed by a processor of a computational device, the computational device having a storage, the method comprising:
   with the processor,
      interacting with a parameter, the parameter for tracking a number of performed arithmetic operations,
      calculating a growth rate of a word length for storing a result in a storage of the computational device, where:
         the result is produced based on the performing the arithmetic operations using a plurality of numbers,
         the calculating is based on the parameter,
         the growth rate is related to the number of performed arithmetic operations, and
         the growth rate is independent of a length of the plurality of numbers used in the performed arithmetic operations, and
      allocating a word of a first word length in the storage of the computational device for storing a result of a selected one of the performed arithmetic operations,
      allocating a word of a second word length in the storage of the computational device for storing the result of one of the performed arithmetic operations that is performed subsequent to the selected one of the performed arithmetic operations in the storage, wherein the second word length is based on the calculated growth rate.

2. The method of claim 1, where each of the plurality of numbers has a length and the length is undetermined prior to performing the arithmetic operations using the plurality of numbers.

3. The method of claim 1, where the arithmetic operations include one or more of an addition operation, a subtraction operation and a multiplication operation.

4. The method of claim 1, where:
   the growth rate of the word length needed for storing for the result is represented using a number of digits, and
   the number of digits is proportional to $\log_b (N)$, where:
      N is a number of arithmetic operations performed, and
      b is a base of operands in the performed arithmetic operations.

5. The method of claim 4, where the base, b, is one of 2 or 10.

6. The method of claim 1, where at least one of the plurality of numbers is a fixed-point number.

7. The method of claim 1, where the result is a fixed-point number.

8. The method of claim 1, further comprising:
maintaining a minimum word length for storing the result, the maintaining performed without overflowing the word length.

9. A non-transitory computer-readable medium to store instructions, the instructions comprising:
one or more instructions that, when executed by a processor of a computational device having a storage, cause the processor to:
interact with a parameter, the parameter for tracking a number of performed arithmetic operations,
calculate a growth rate of a word length for storing a result in the storage of the computational device, where:
the result is produced based on the performing the arithmetic operations using the plurality of numbers,
the calculating is based on the parameter,
the growth rate is related to the number of performed arithmetic operations, and
the growth rate is independent of a length of the plurality of numbers used in the performed arithmetic operations, and
allocate a word of a first word length in the storage of the computational device for storing a result of a selected one of the performed arithmetic operations,
allocate a word of a second word length in the storage of the computational device for storing the result of one of the performed arithmetic operations that is performed subsequent to the selected one of the performed arithmetic operations in the storage, wherein the second word length is based on the calculated growth rate.

10. A method performed by a processor of a computational device, the computational device having a storage, the method, comprising:
receiving a plurality of numbers, where:
the plurality of numbers have lengths, respectively, and
the receiving is performed using a processing device;
with the processor, performing a plurality of arithmetic operations on the plurality of numbers, where:
the performing is performed using the processing device;
with the processor incrementing a parameter, N, when performing the plurality of arithmetic operations, where:
N is related to a number of arithmetic operations performed,
N is independent of the respective lengths of the plurality of numbers, and
the incrementing is performed using the processing device; and
with the processor, allocating a word of a first word length based on N in the storage of the computational device for storing a result of a selected one of the arithmetic operations performed;
with the processor, allocating a word of a second word length in the storage of the computational device, the second word length being based on N, where:
the word stores a result of a second of the arithmetic operations performed on the plurality of numbers after the first one of the arithmetic operations performed in the storage of the computational device.

11. A non-transitory computer-readable medium to store instructions, the instructions comprising:
one or more instructions that, when executed by a processor, cause the processor to:
receive a plurality of numbers, the plurality of numbers having lengths, respectively;
perform a plurality of arithmetic operations on the plurality of numbers;
increment a parameter, N, when performing the plurality of arithmetic operations, where:
N is related to a number of arithmetic operations performed, and
N is independent of the respective lengths of the plurality of numbers; and
allocate a word of a first word length based on N in a storage of a computational device for storing a result of a selected one of the arithmetic operations performed;
allocating a word of a second word length in the storage based on N, the word storing a result a second of the arithmetic operations performed on the plurality of numbers after the first of the arithmetic operations is performed.

12. The non-transitory computer-readable medium of claim 11, further comprising:
one or more instructions that, when executed by the processor, cause the processor to:
generate the result based on the performing.

13. The non-transitory computer-readable medium of claim 11, wherein the one or more instructions to increase the word length include:
one or more instructions that, when executed by the processor, cause the processor to:
add one or more digits to the word.

14. The non-transitory computer-readable medium of claim 11, where:
the word comprises a number of digits, and
the number of digits is incremented by one when ceil($\log_b$ (N+1)) increments by a whole number, where:
b refers to a base of operands in the arithmetic operations.

15. The non-transitory computer-readable medium of claim 14, wherein the base, b, is one of 2 or 10.

16. The non-transitory computer-readable medium of claim 11, further comprising:
one or more instructions that, when executed by the processor, cause the processor to:
determine that the result grows by a digit; and
increase the word length by a digit, the increasing based on the determining.

17. The non-transitory computer-readable medium of claim 11, where at least one of the plurality of numbers is a fixed-point number.

18. The non-transitory computer-readable medium of claim 11, further comprising:
one or more instructions that, when executed by the processor, cause the processor to:
maintain a minimum word length based on N, the maintaining performed without overflowing the word length.

19. The non-transitory computer-readable medium of claim 11, where the plurality of arithmetic operations include one or more of an addition operation, a subtraction operation, and a multiplication operation.

* * * * *